United States Patent
Wissman et al.

(10) Patent No.: US 10,596,732 B2
(45) Date of Patent: Mar. 24, 2020

(54) STAMPING PRESS LINE STATION APPARATUS AND APPARATUS AND METHOD FOR MAKING THE SAME

(71) Applicant: FORD GLOBAL TECHNOLOGIES, LLC, Dearborn, MI (US)

(72) Inventors: Robert Bryan Wissman, Oxford, MI (US); Jonathan Kyle Ellert, Warren, MI (US); Kevin J. Blaser, Brighton, MI (US)

(73) Assignee: Ford Motor Company, Dearborn, MI (US)

( * ) Notice: Subject to any disclaimer, the term of this patent is extended or adjusted under 35 U.S.C. 154(b) by 691 days.

(21) Appl. No.: 14/933,772

(22) Filed: Nov. 5, 2015

(65) Prior Publication Data
US 2017/0129142 A1 May 11, 2017

(51) Int. Cl.
| | |
|---|---|
| *B21D 43/05* | (2006.01) |
| *B29C 39/10* | (2006.01) |
| *B29C 39/02* | (2006.01) |
| *B29C 39/26* | (2006.01) |
| *B29K 75/00* | (2006.01) |
| *B33Y 80/00* | (2015.01) |
| *B29C 33/38* | (2006.01) |
| *B29C 33/00* | (2006.01) |

(52) U.S. Cl.
CPC ............ *B29C 39/10* (2013.01); *B21D 43/057* (2013.01); *B29C 39/026* (2013.01); *B29C 39/26* (2013.01); *B29C 33/005* (2013.01); *B29C 33/0061* (2013.01); *B29C 33/3807* (2013.01); *B29C 33/3842* (2013.01); *B29K 2075/00* (2013.01); *B33Y 80/00* (2014.12)

(58) Field of Classification Search
None
See application file for complete search history.

(56) References Cited

U.S. PATENT DOCUMENTS

| | | | | |
|---|---|---|---|---|
| 4,783,298 | A | * | 11/1988 | Oda .................... B29C 37/0028 118/37 |
| 6,017,973 | A | | 1/2000 | Tamura et al. |
| 6,103,156 | A | | 8/2000 | Holtzberg |
| 10,149,581 | B2 | * | 12/2018 | Xie .................... B29C 45/14311 |
| 2003/0011106 | A1 | | 1/2003 | Osaki |
| 2005/0064178 | A1 | | 3/2005 | Gray et al. |

FOREIGN PATENT DOCUMENTS

CN  104545656 A  4/2015

OTHER PUBLICATIONS

Brady Blackburne Godbey; "Surface Finish Control of 3D Printed Metal Tooling"; All Theses, Paper 234; Clemson University, Aug. 23, 2007; pp. 1-87, TigerPrints, USA.
English Machine Translation of CN104545656A dated Apr. 29, 2015.
Office Action dated Jan. 14, 2020 for Application No. CN201610935586X, filed Nov. 1, 2016.

* cited by examiner

*Primary Examiner* — Pradeep C Battula
(74) *Attorney, Agent, or Firm* — Vincent Mastrogiacomo; King & Schickli, PLLC

(57) ABSTRACT

An apparatus is provided for molding a contact pad in place on an automation template. The apparatus includes an automation template having a contact pad retainer and a molding cap received over the contact pad retainer and retained using a self-locking fit. A mold cavity is formed between the automation template and the molding cap.

7 Claims, 11 Drawing Sheets

STAMPING PRESS LINE STATION APPARATUS AND APPARATUS AND METHOD FOR MAKING THE SAME

TECHNICAL FIELD

This document generally relates to the field of automation templates and, more particularly, to an automation template including an integral contact pad that is molded in place and self-attached thereto as well as to an apparatus and method for making that improved automation template.

BACKGROUND

Stamping press lines are commonly utilized in the motor vehicle manufacturing industry in order to produce body panels from sheet metal materials. Such stamping press lines often require the use of idle station template nests for class-A surfaces. Those template nests utilize urethane pads where there is panel contact. Further it should be appreciated that the template nests are part and press line specific.

Current manufacturing of template nests with urethane pads is costly, requiring multiple manufacturing steps as well as intensive machining and assembly time. Material utilization is extremely low due to stock size limitation. Further designs are restrictive due to lack of machining capabilities with multiple pieces required for final assembly.

Reference is now made to FIG. 1 showing a prior art template nest. In accordance with current practice, the pad P is made with custom poured urethane strips S having an extruded aluminum base B. The custom pads P are cut to desired length and hand-drilled with mounting holes. The shorter strips of urethane are mounted to the template T with 2-3 fasteners F which require the template to match with tapped holes. The template assembly is 3D machined and manually deburred. The entire process is limited by available predetermined stock sizes. Further, the durometer of the urethane utilized is limited to that which can be machined to shape. Typically, such a durometer is not ideal for handling class-A surfaces.

This document relates to a new and improved apparatus for a stamping press line station in the form of an automation template including an integral contact pad molded in place and self-attached to the template. Such a pad may be made in substantially any desired shape with substantially any desired durometer in order to provide optimum performance when handling class-A surfaces of sheet metal parts.

SUMMARY

In accordance with the purposes and benefits set forth herein, an apparatus is provided for molding a contact pad in place on an automation template. That apparatus comprises an automation template including a contact pad retainer and a molding cap received over the contact pad retainer and forming a mold cavity between the automation template and the molding cap.

In one possible embodiment the automation template also includes a sprue in communication with the mold cavity to allow the delivery of the casting material to the mold cavity.

In one possible embodiment the molding cap includes a support structure for holding the automation template, the mold cavity and the sprue in a desired orientation for delivering casting material to the mold cavity and forming the contact pad in place on the automation template.

In yet another possible embodiment, the automation template includes a second contact pad retainer and the molding cap is received over the second contact pad retainer so as to form a second mold cavity between the automation template and the molding cap. Still further, the automation template may also include a second sprue for communication with the second mold cavity.

In one particularly useful embodiment, the automation template, the contact pad retainer and the sprue are all of unitary construction. Further, the automation template, the contact pad retainer and the sprue may be made by selective laser sintering (SLS).

In accordance with an additional aspect, an apparatus is provided for a stamping press line station. That apparatus comprises an automation template including an integral contact pad molded-in-place and self-attached thereto.

In one possible embodiment the automation template includes a contact pad retainer. In one possible embodiment the automation template includes a sprue. In one possible embodiment the automation template, the contact pad retainer and the sprue are all of unitary construction.

More specifically, the contact pad retainer may include a channel and the sprue may be provided in communication with that channel. Further the contact pad may include a section molded in place and captured within that channel.

In one possible embodiment the contact pad may also include an exposed face and vent grooves. Further the contact pad may have a durometer between 20 A and 70 D.

In accordance with an additional aspect, an idle station on a stamping press line is provided incorporating an automation template including the integral contact pad molded in place and self-attached to the automation template.

In accordance with another aspect, a lifter station on a stamping press line is provided incorporating an automation template including an integral contact pad molded in place and self-attached to the automation template.

In accordance with yet another aspect, a method is provided for producing an automation template for a stamping press line. That method may be broadly described as comprising the steps of: (a) creating an automation template with a contact pad retainer and a sprue, (b) positioning a molding cap over the contact pad retainer and forming a mold cavity between the automation template and the molding cap, (c) delivering a casting material to the mold cavity through the sprue and curing a contact pad in place on the automation template and (d) removing the molding cap.

Still further, the method may include the step of capturing a portion of the contact pad within a channel of the contact pad retainer. Still further the method may include molding vent grooves in an exposed face of the contact pad.

In the following description, there are shown and described several preferred embodiments of the molding apparatus, stamping press line station apparatus and method of producing an automation template for a stamping press line. As it should be realized, the apparatus and method are capable of other, different embodiments and its several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof. In the drawing figures.

Reference will now be made in detail to the present preferred embodiments of the apparatus, examples of which are illustrated in the accompanying drawing figures.

DETAILED DESCRIPTION

Figure 1:
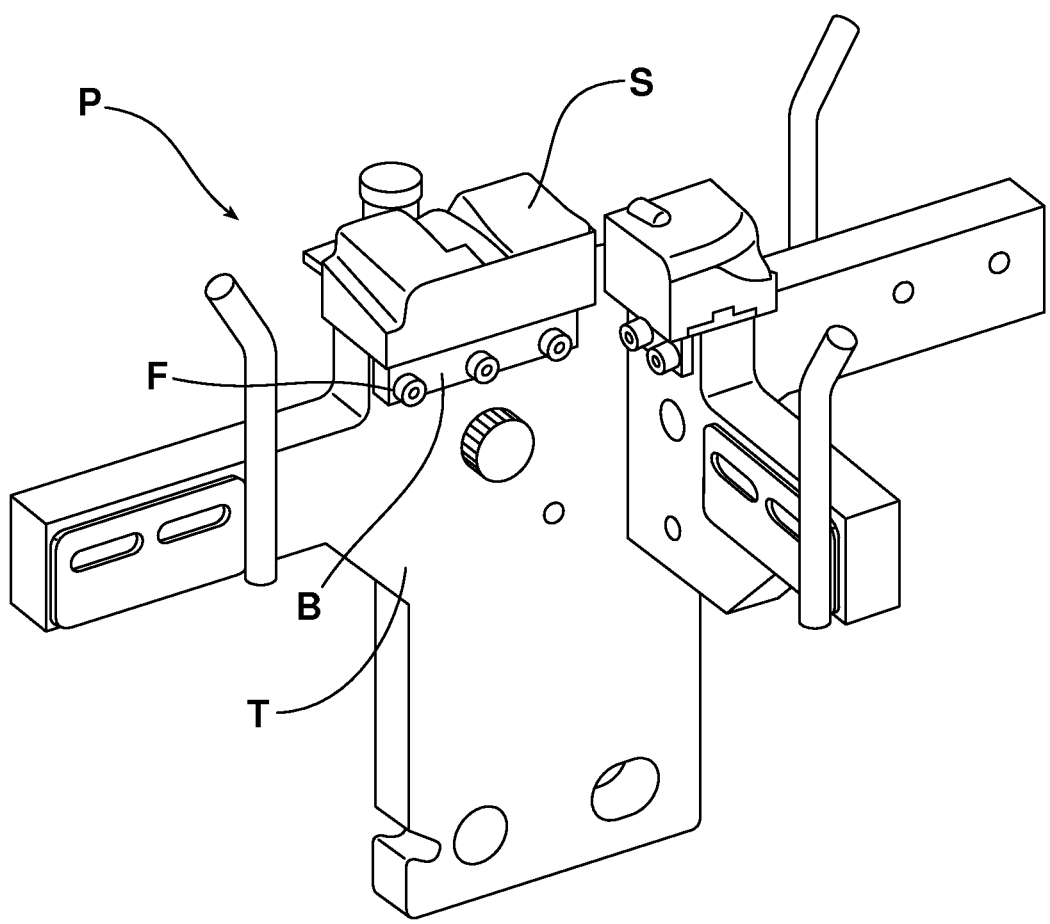
FIG. 1 is a perspective view of an automation template constructed in accordance with prior art procedures utilizing custom poured and CNC machined urethane strips attached to the template by means of extruded aluminum bases and cooperating screw fasteners.
Figure 2:
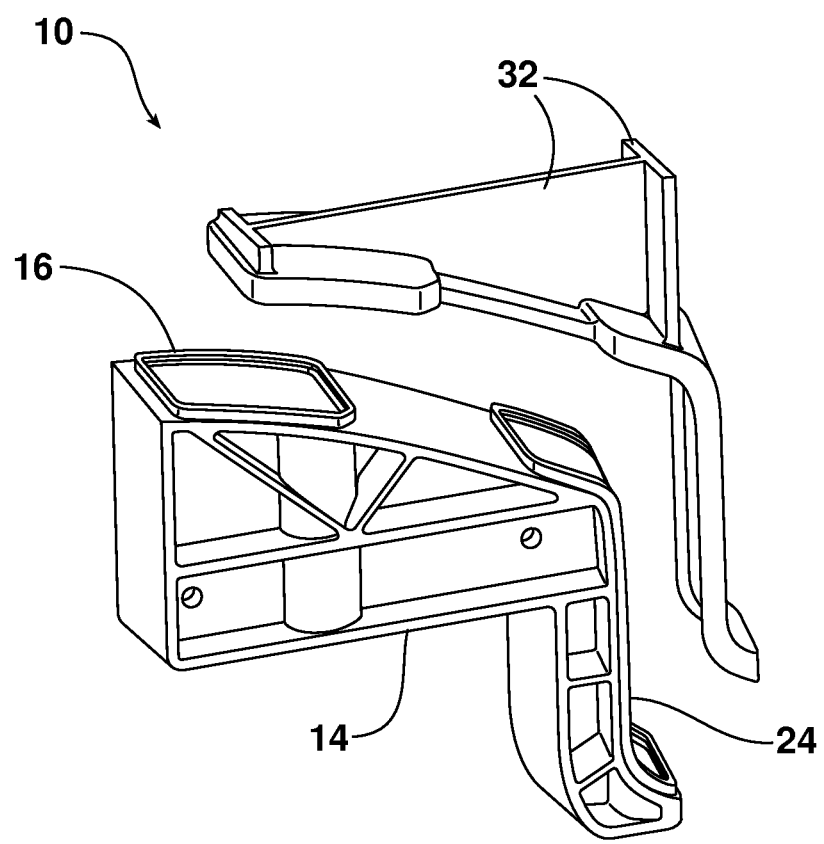
FIG. 2 is an exploded perspective view of an apparatus utilized for molding a contact pad in place on an automation template.

Reference is now made to FIGS. 2-5 illustrating an apparatus 10 for molding a contact pad 12 in place on an automation template 14. As illustrated in FIG. 2, the automation template 14 includes a contact pad retainer 16. As illustrated in cross-section in FIG. 4, that contact pad retainer 16 may take the form of a locking step including a channel 18, the function of which will be described in greater detail below.

Figure 11:
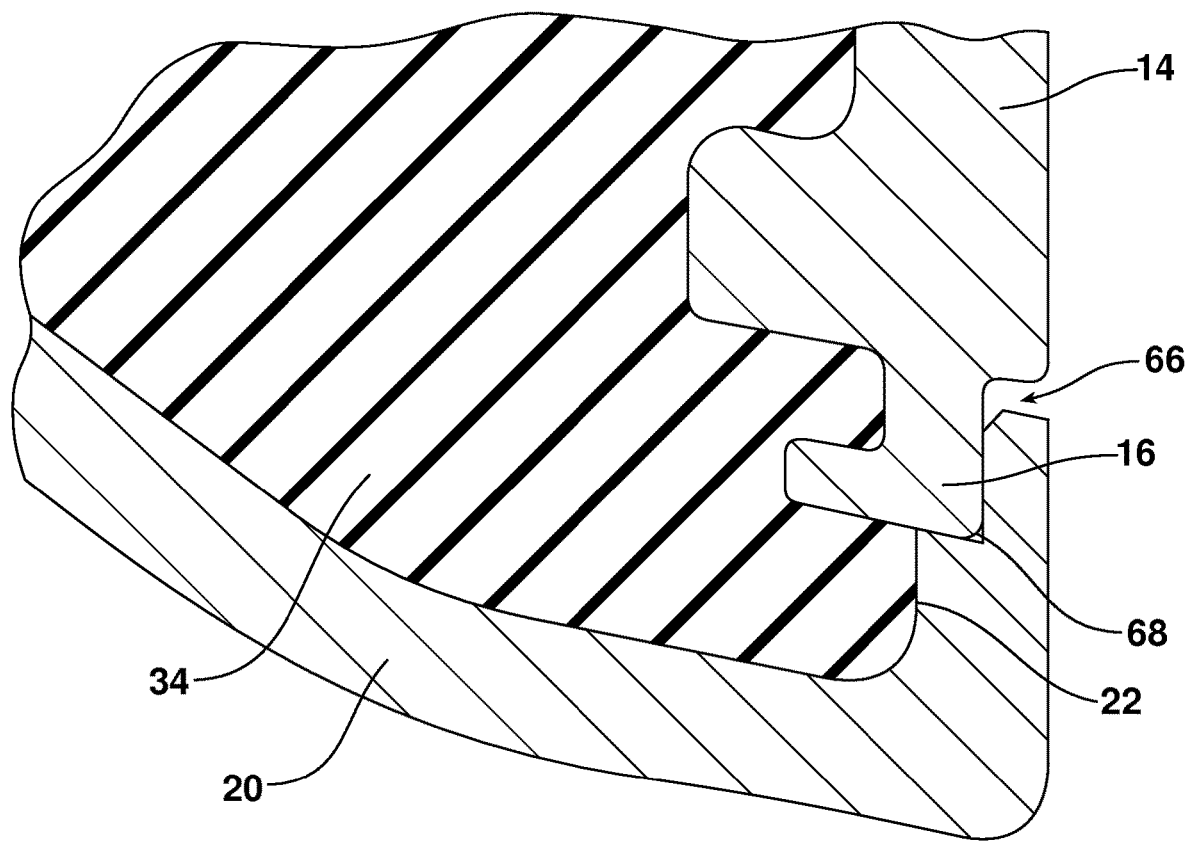
FIG. 11 is a detailed view illustrating the cooperating chamfer on the cap and radius on the contact pad retainer that allow for easy alignment of the cap with the retainer and a self-locking fit.

As illustrated in FIGS. 2-5, the apparatus 10 also includes a molding cap 20 that is received over and around the contact pad retainer 16. The molding cap 20 may be attached to and held in a proper, seated position on the template 14 by means of a wedge fit which provides a self-locking function. See FIG. 11 and note the chamfer 66 on the molding cap 20 and the radius 68 on the contact pad retainer 16 which create a lead for easier alignment of the cap. Together, the automation template 14 and molding cap 20 form or define a mold cavity 22 between the automation template and the molding cap. As shown, the contact pad retainer 16 is completely retained in the mold cavity 22. As should also be appreciated, in the illustrated embodiment, the automation template includes a second contact pad retainer 24 and the molding cap 20 includes appropriate structure for forming a second mold cavity 26 around the second contact pad retainer 24 on the automation template 14.

Figure 3:
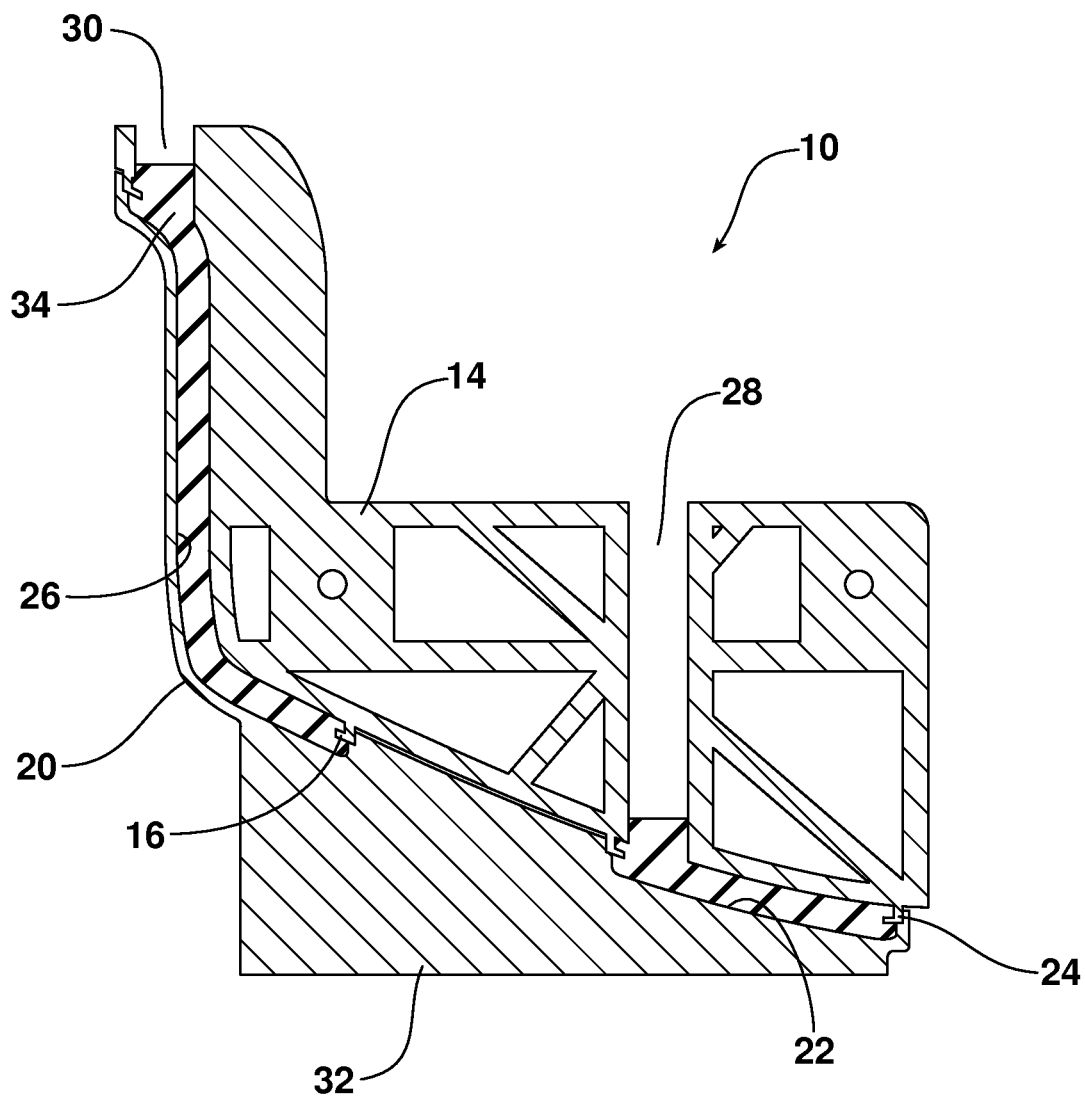
FIG. 3 is a schematic cross-section illustrating the molding of the urethane contact pad in place on the automation template.

As best illustrated in FIG. 3, the automation template 14 includes a first passageway or sprue 28 in communication with the first mold cavity 22 and a second passageway or sprue 30 in communication with the second mold cavity 26.

Figure 5:
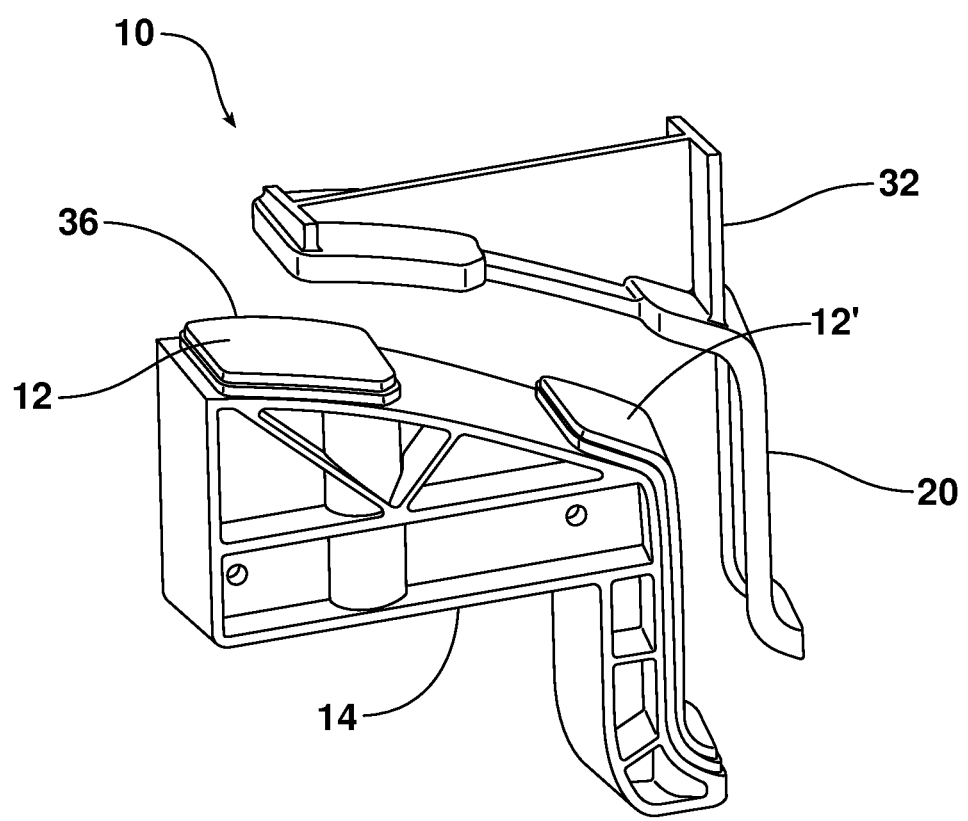
FIG. 5 illustrates the removal of the molding cap from the template with the contact pads molded in place.

As also shown in FIGS. 3 and 5, the molding cap 20 includes a support structure or rib such as the illustrated rib 32 for holding the automation template 14, the mold cavities 22, 26 and the sprues 28, 30 at a desired orientation for delivering the casting material to the mold cavities and forming the contact pads 12, 12' in place on the automation template. That casting material 34 is shown as poured through the sprues 28, 30 into the mold cavities 22, 26 in FIG. 3.

In one possible embodiment, the automation template 14, the contact pad retainers 16, 24 and the sprues 28, 30 are of unitary construction. In one particularly useful embodiment, the automation template 14 including all contact pad retainers 16, 24 and all sprues 28, 30 are 3D printed utilizing selective laser sintering (SLS). The separate molding cap 20 may also be 3D printed by selective laser sintering if desired.

Figure 4:
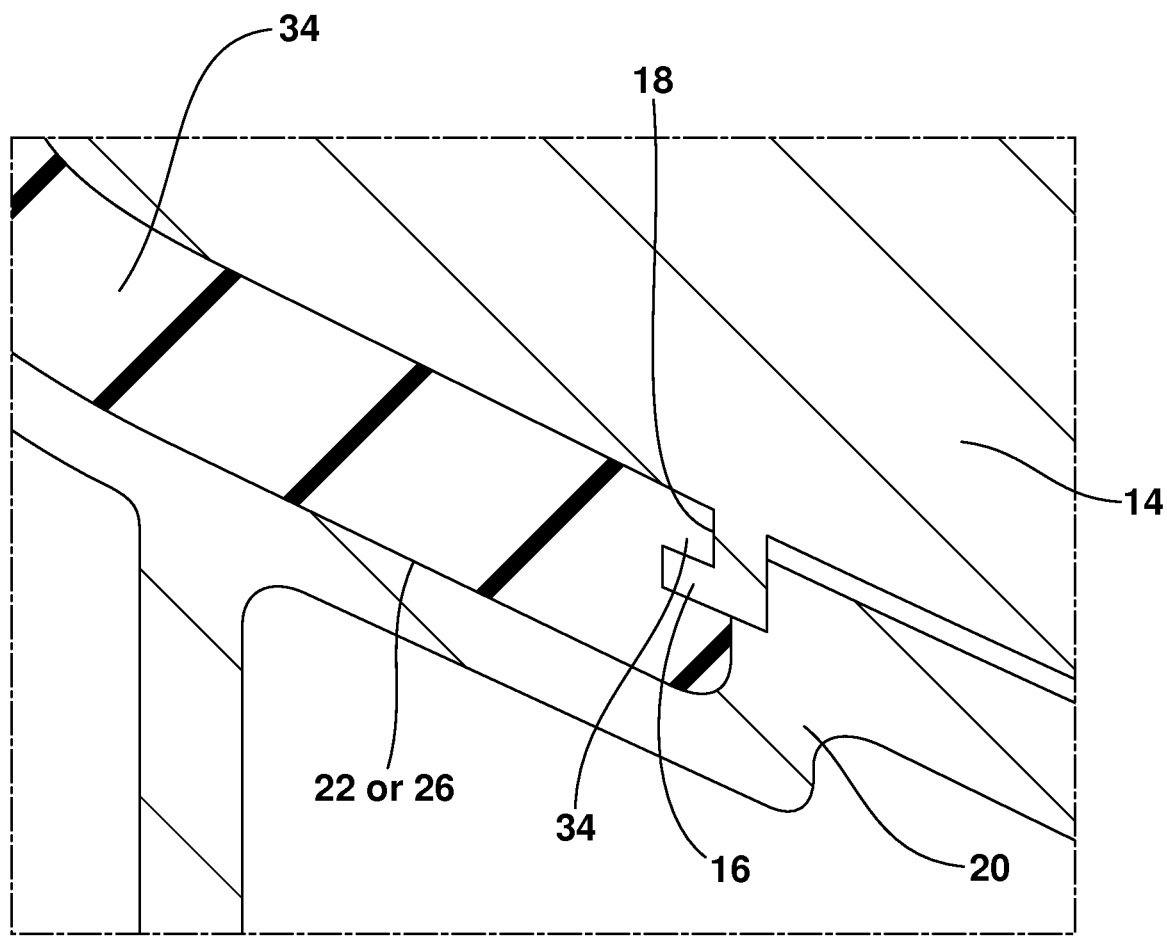
FIG. 4 is a detailed schematic view illustrating the retention feature on the automation template that holds the cured contact pad in place.

As should be appreciated from viewing FIGS. 3 and 4, when the casting material is poured into the mold cavities 22, 26, it flows into the channel 18 formed by the contact pad retainers 16, 24. Thus, upon curing, the contact pads 12, 12' include a section 34 captured in the channel 18. In this way the contact pads 12, 12' are molded-in-place and anchored to the automation template 14. Once the urethane casting material has fully cured, the molding cap 20 is removed and the contact pads 12, 12' are anchored in place on the face of the automation template 14. As should be appreciated, those contact pads 12, 12' may include an exposed face 36 having vent grooves 38, the function of which will be described in greater detail below.

Significantly, the molding of the contact pads 12, 12' in place on the automation template 14 provides a number of benefits and advantages. The pads 12, 12' may be molded into any customized shape required for any particular application. Since no machining of the pad material is required, the durometer of the urethane material is not limited to durometers appropriate for CNC or other machining. Thus, the contact pads 12, 12' may have a durometer between 20 A and 70 D if desired in order to provide the best performance when handling class-A surfaces of sheet metal panels undergoing processing.

Figure 6:
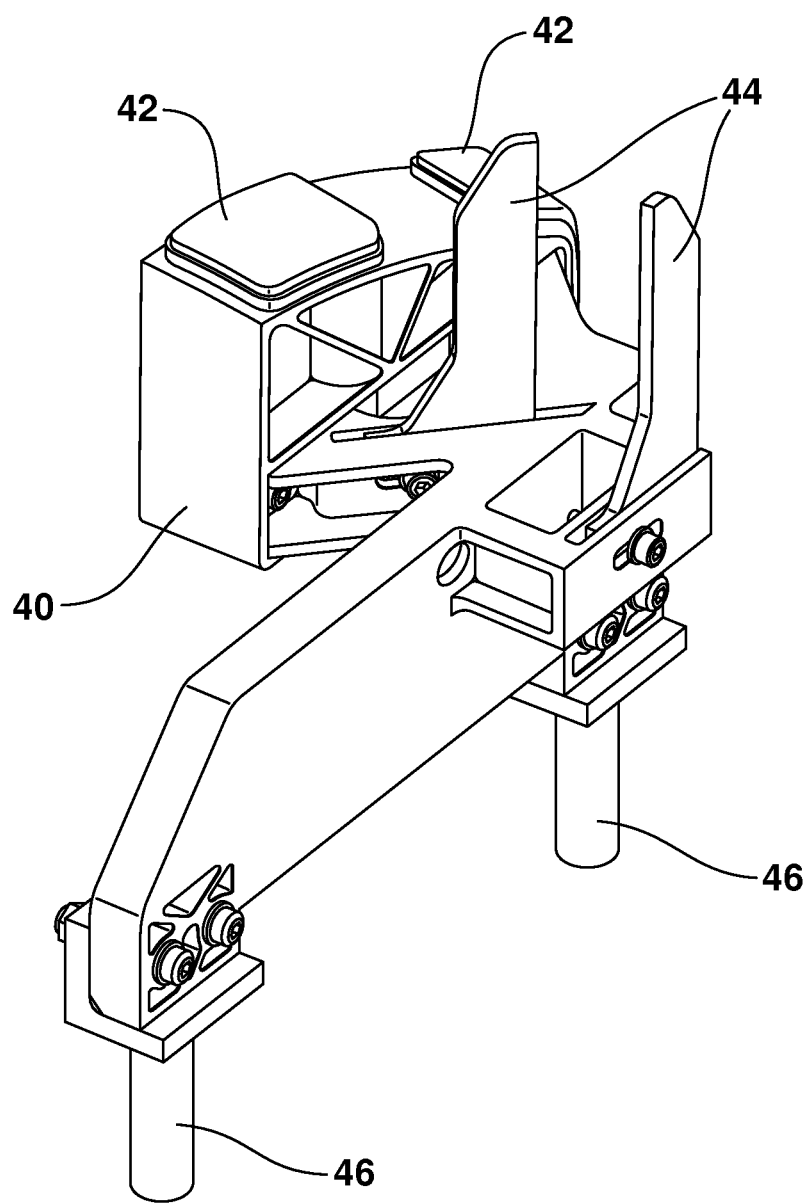
FIG. 6 is a perspective view of the completed automation template including the urethane contact pads, appropriate panel gauges and adaptors for a stamping press installation.

FIG. 6 illustrates a stamped metal transfer automation template 40 incorporating two integral contact pads 42 that are molded-in-place and self-attached to the automation template. As should be appreciated the stamped metal automation template 40 also includes appropriate panel edge gauges 44 for proper handling of a sheet metal panel being processed as well as appropriate adapters 46 for stamping press installation.

Figure 7:
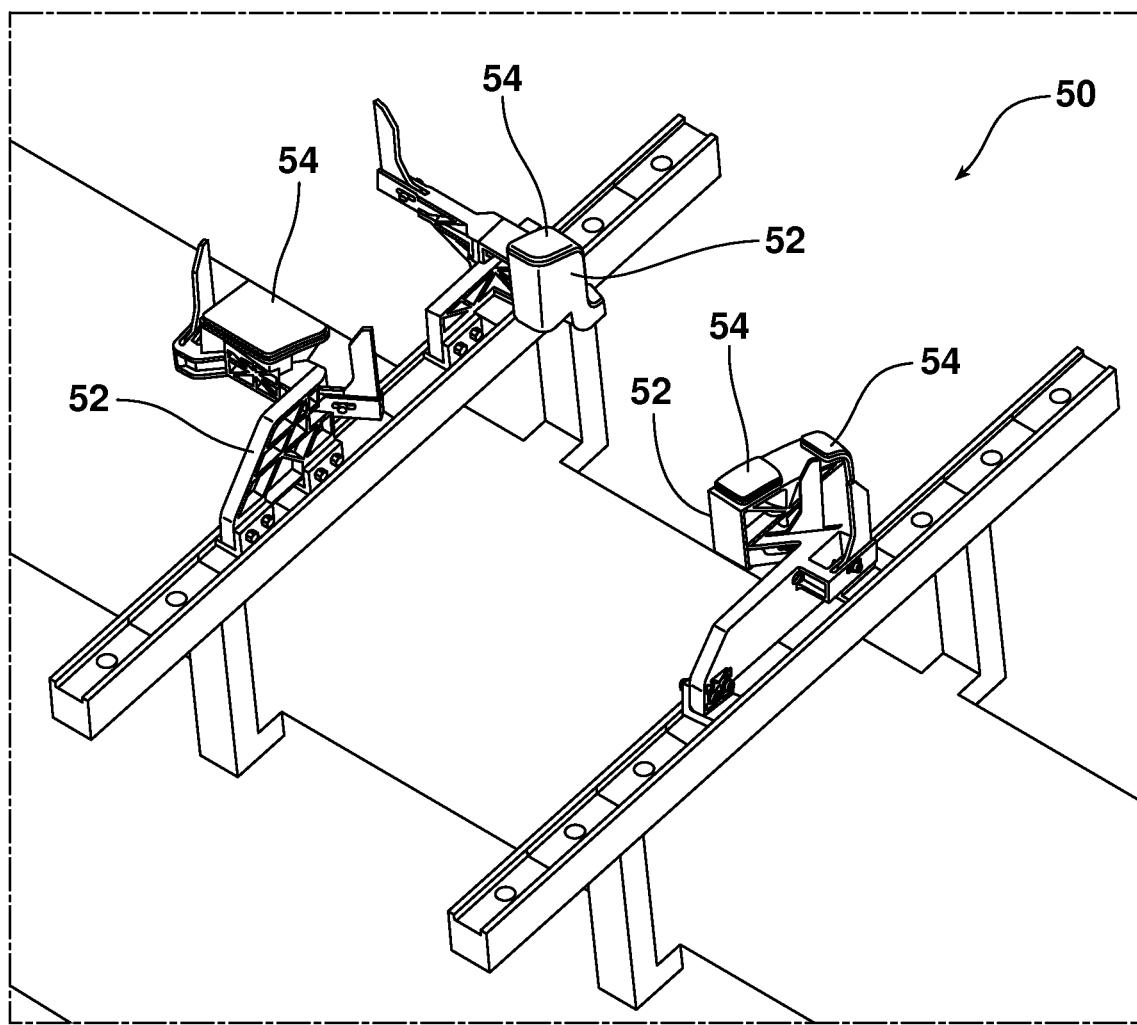
FIG. 7 is a perspective overview of a stamped metal transfer automation template incorporating integral contact pads that are molded in place and self-attached to the automation template.

FIG. 7 shows an idle station 50 on a stamping press line incorporating several stamping metal automation templates 52 including molded-in-place contact pads 54.

Figure 8:
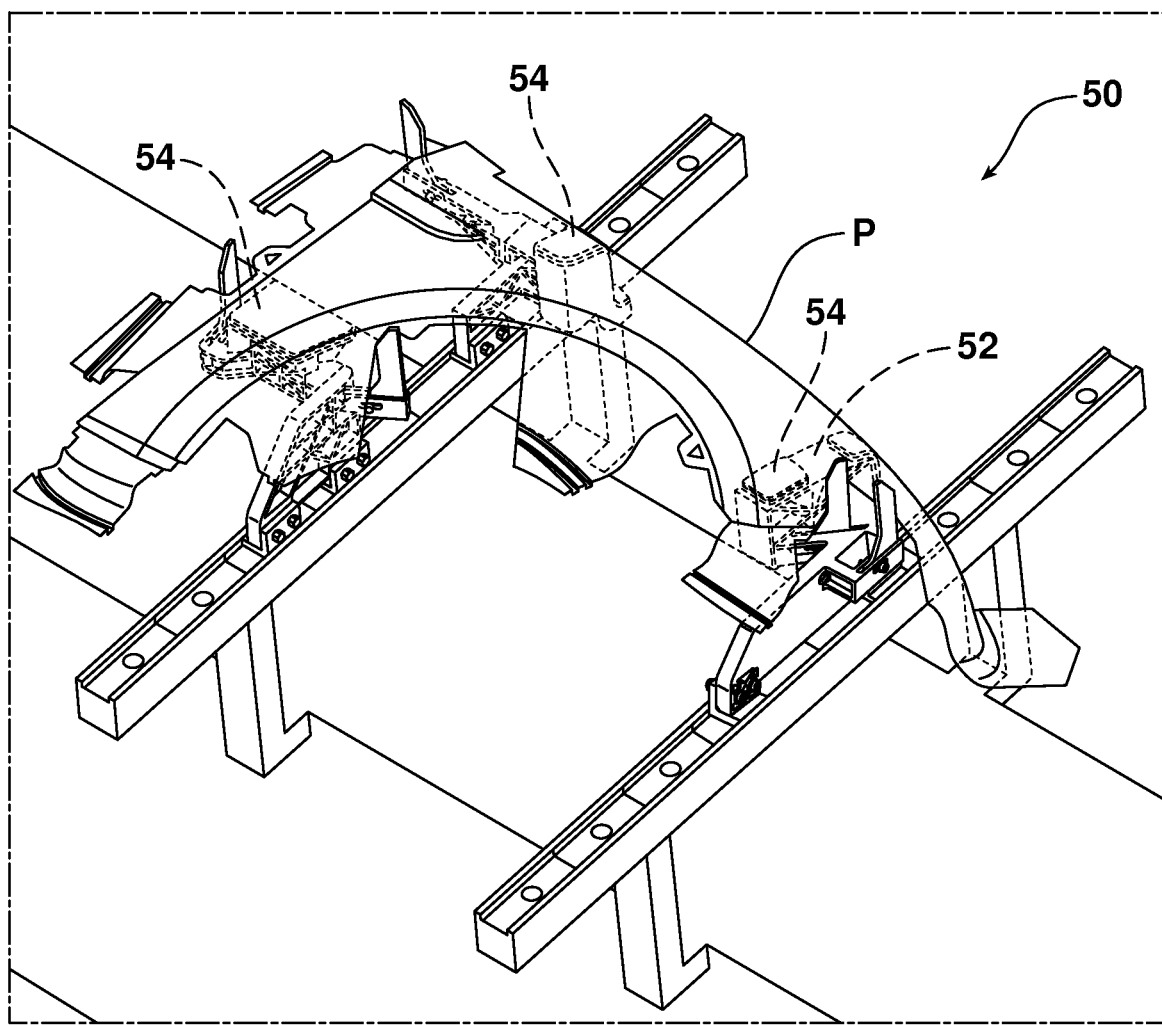
FIG. 8 is a view similar to FIG. 7 showing the templates holding a sheet metal panel undergoing production.
Figure 9:
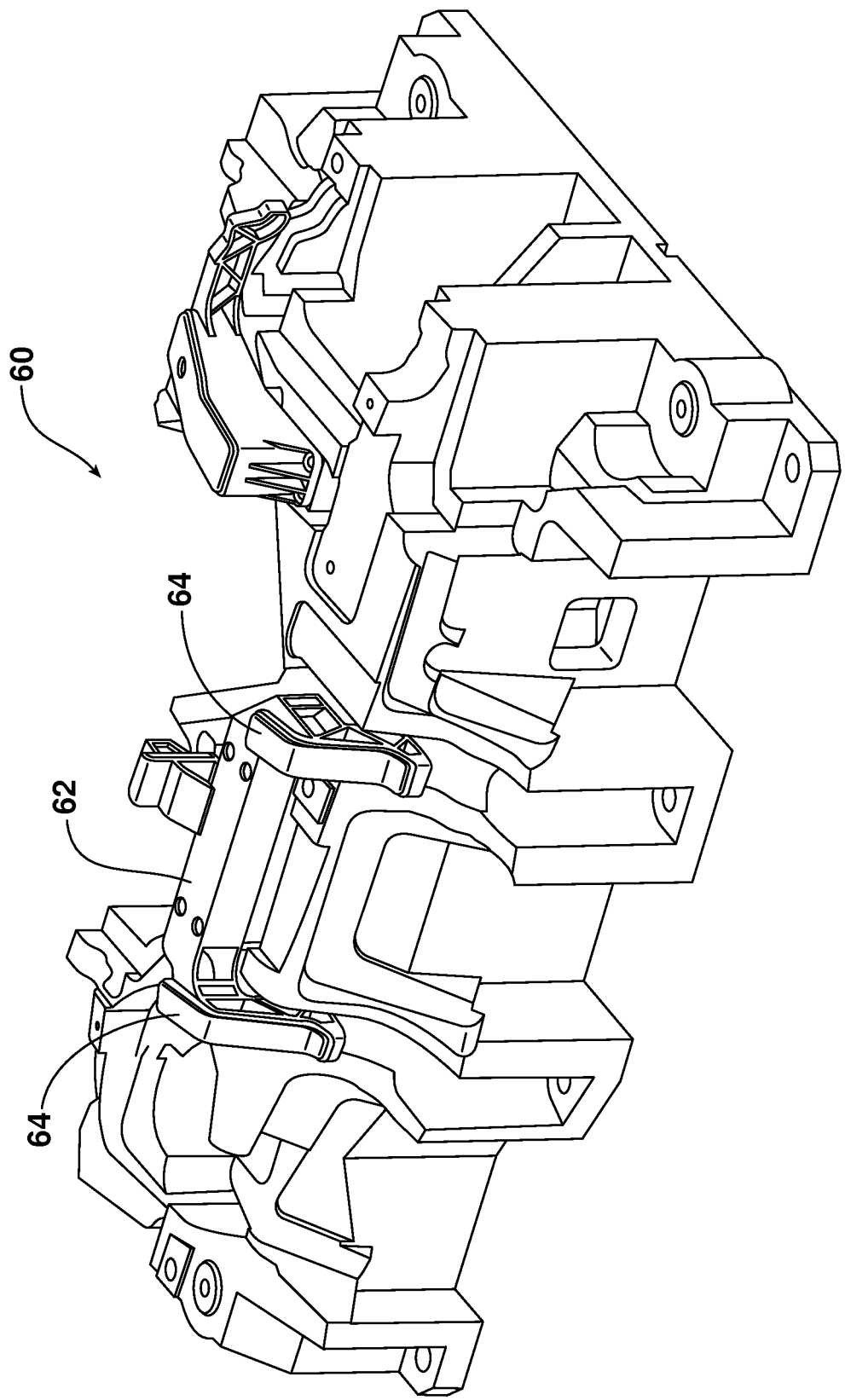
FIG. 9 is a perspective view of a stamp mold transfer automation template in a lifter station or stamping die.

FIG. 8 is a view similar to FIG. 7 but showing a sheet metal panel P (e.g. a fender) being held in place on the pads 54 of the stamped metal automation templates 52. FIG. 9 illustrates a lifter station 60 for lifting the sheet metal panels undergoing processing into and out of a die. As illustrated, the lifter station 60 includes a stamped metal automation template 62 including molded-in-place contact pads 64.

Figure 10:
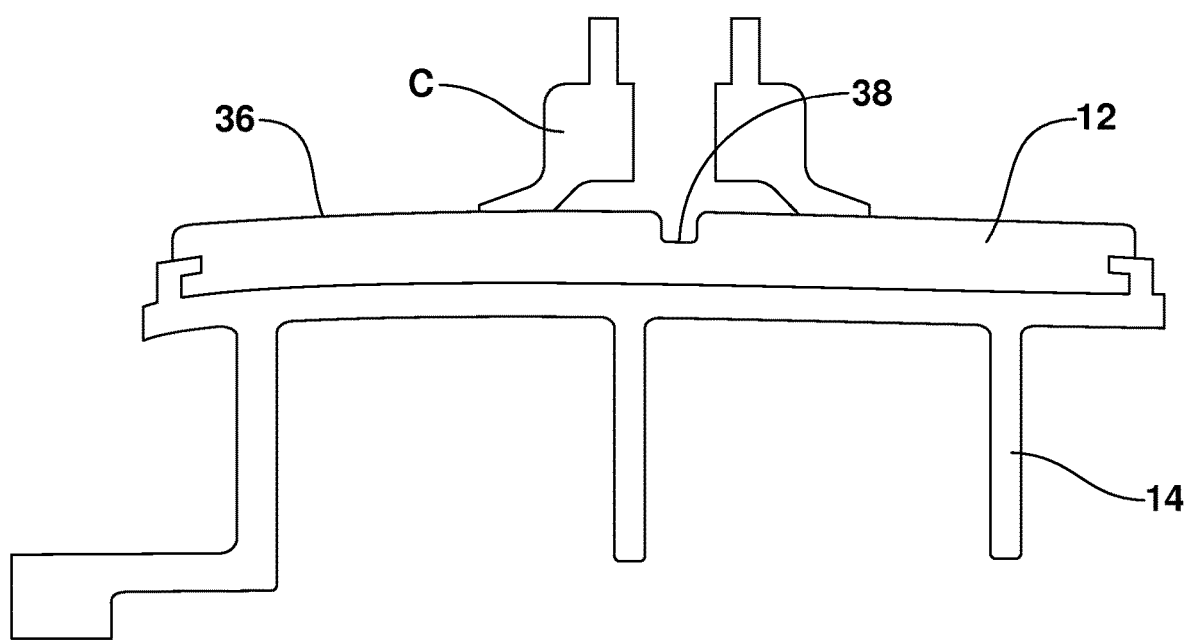
FIG. 10 is a detailed schematic view illustrating how a groove or channel formed in the face of the pad allows for the passage of air which prevents a suction cup from latching onto the pad and pulling it from the automation template when a transfer station is cycled without a part present on the pad.

Reference is now made to FIG. 10 illustrating in detail a contact pad 12 molded-in-place on an automation template 14. That contact pad 12 includes a face 36 with a vent groove 38. For many applications, panels are transferred from station to station along a stamping press line utilizing transfer arms equipped with suction cups C. Frequently, stamping presses are cycled without a panel present on the pads 12, 12'. In those instances, the suction cup C engages the pad 12. As shown, one groove 38 in the face 36 of the contact pad 12 allows for the passage of air thereby preventing the suction cup C from latching onto the pad 12 and pulling it from the automation template 14.

In summary, numerous benefits are provided by the apparatus 10. The automation template 14 including the integral contact pad 12 may be CAD designed and sent to an SLS printer with minimal assembly for the urethane pouring process. Once cured, the molding cap 20 is removed to expose the desired pad shape which does not require machining or deburring. Further, the contact pad 12 is not limited to a minimal durometer for machining thereby allowing the use of much softer urethane that is more class-A surface friendly. In addition, a significantly less amount of urethane is required while increasing pad size for panel contact area thereby providing a much lighter apparatus 10. Further, it should be appreciated that apparatus 10 is consistent with a method of producing an automation template for a stamping press line. That method includes a step of creating an automation template 14 with a contact pad retainer 16 and/or 24 and a sprue 28 and/or 30. Further the method includes positioning a molding cap 20 over the contact pad retainer 16 and/or 24 and forming a mold cavity 22 and/or 26 between the automation template 14 and the molding cap 20. Still further, the method includes delivering a casting material such as liquid urethane to the mold cavity 22 or 26 through the sprue 28 and/or 30 and curing a contact pad 12 and/or 12' in place on the automation template 14. This is followed by the removing of the molding cap 20. In one particularly useful embodiment the method also includes capturing a portion 34 of the contact pad 12 or 12' within a channel 18 of the contact pad retainer 16 and/or 24. Further the method includes molding vent grooves 38 into an exposed face 36 of the contact pad 12 or 12'.

The foregoing has been presented for purposes of illustration and description. It is not intended to be exhaustive or to limit the embodiments to the precise form disclosed. Obvious modifications and variations are possible in light of the above teachings. For example, while two mold cavities 22, 26 are provided on the embodiment illustrated in FIG. 3, it should be appreciate that substantially any number of mold cavities and pads 12, 12' may be provided as necessary or desired for a particular application. All such modifications and variations are within the scope of the appended claims when interpreted in accordance with the breadth to which they are fairly, legally and equitably entitled.

What is claimed:

1. An apparatus for a stamping press line station, comprising:
 a template including (a) a contact pad retainer, (b) a sprue in communication with said contact pad retainer and (c) an integral contact pad molded in place and self-attached to the template by a section of said integral contact pad captured by said contact pad retainer, wherein said template including said contact pad retainer and said sprue is of unitary construction.

2. The apparatus of claim 1, wherein said contact pad retainer includes a channel and said sprue is in communication with said channel.

3. The apparatus of claim 2, wherein said section of said integral contact pad is captured within said channel.

4. The apparatus of claim 3, wherein said contact pad includes an exposed face having vent grooves.

5. The apparatus of claim 1, wherein said contact pad has a durometer of between 20 A and 70 D.

6. An idle station on a stamping press line incorporating the apparatus of claim 1.

7. A lifter station on a stamping press line incorporating the apparatus of claim 1.

* * * * *